Patented May 13, 1924.

1,494,218

UNITED STATES PATENT OFFICE.

HEBER C. CUTLER, OF SALT LAKE CITY, UTAH, ASSIGNOR, BY DIRECT AND MESNE ASSIGNMENTS, TO UNITED STATES SYRUP COMPANY, A CORPORATION OF UTAH.

PROCESS OF REFINING MOLASSES.

No Drawing. Application filed August 17, 1920. Serial No. 404,063.

*To all whom it may concern:*

Be it known that I, HEBER C. CUTLER, a citizen of the United States, and a resident of Salt Lake City, county of Salt Lake and State of Utah, have made certain new and useful Improvements in Processes of Refining Molasses, of which the following is a full and complete specification.

The use of molasses which exists abundantly as refuse from the various operations of sugar refining, has in general met with numerous disadvantages. Prominent among these is the fact that such molasses is contaminated with various inorganic and organic impurities. Moreover where purification has been attempted, the results obtained have not been uniform. There are in addition certain legal standards regarding the purity and concentration of the product which it is difficult to maintain with any measure of success and economy.

The present invention utilizes the refuse molasses obtained in the manufacturing and refining of sugars. In particular, it is primarily intended to utilize the molasses produced as a by-product in the beet sugar industry. Molasses resulting from the manufacturing and refining of sugar from beets carries very large proportions of inorganic salts and organic compounds.

Where molasses is produced in this industry, its analysis shows a large percentage or organic salts, which may exceed 5% of the total weight of the material. Also there are present, deleterious inorganic compounds. The customary uses to which such material can be put are as syrups intended for human consumption; as ingredients in compounding stock foods, and as a source of industrial alcohol.

When intended for the uses above mentioned certain standards have been legally recognized as necessary to guard the consumer. Prominent among these standards are the requirements that contained mineral shall be less than 5% by weight and that the water present shall be less than 25% by weight. It has been found that a higher percentage of mineral matter is exceedingly deleterious, rendering the compound unfit for human consumption and prejudicial to the health and life of cattle.

It is the prime object of my invention to produce a non-crystalline syrup from the refuse molasses of the above description, suitable for use either alone or in combination with other food stuffs and for human consumption and cattle foods. It is a further object of my invention to refine the material by the removal of saline impurities which will otherwise render it unfit for use as food. This process moreover promotes the palatability of the compound by the removal of volatile impurities and substances which give the raw material a disagreeable odor and flavor. By my invention the water content is uniformly controlled, while a high percentage or all of the albuminoids present are removed.

More particularly referring to its application in the refining of beet sugar molasses, my process contemplates the application to the raw material of from one fourth of one per cent to ten per cent of hydrochloric acid or an equivalent of other inverting materials. This acid or an equivalent of other inverting materials is intimately mixed with molasses and is allowed to remain in contact therewith for such length of time as will cause a material inversion of the sugars present. It is found that the most satisfactory extent to which the treatment shall be carried out is a period of time sufficient to cause from 5% to 60% of the sugars present to be inverted. It is generally found desirable that the mixture be heated moderately at this stage to expedite the physical and chemical reactions.

The inorganic impurities in the molasses are mainly the carbonates of the alkali metals. If the molasses contains these salts when dialyzed, the period required for this step is materially longer than will be the case when the salts are first converted to chlorides. The addition of an acid such as hydrochloric acid drives off the carbonic acid and leaves salts such as chlorides which are more readily separated by osmosis. At the same time a large proportion of the organic impurities present as albuminoids are broken down and precipitated out.

The use of acid introduces no difficulty in manipulation as the subsequent heating removes any excess without neutralization, precipitation or other treatment.

Molasses, as produced in the sugar industry and available for this treatment is found to possess wide variation in the sugar content, percentage of impurities and concentration. There must be a corresponding latitude in the amount of acid used. Furthermore, it being the purpose to prevent crystallization of sugar from the resultant syrup, the ultimate concentration of the latter will be a factor in determining the amount of sugar inverted by the acid. To accomplish the above objects it may be stated that approximately one per cent of acid will be required for each five per cent of sugar present in the molasses and that this proportion will be increased if the molasses is found to be abnormally high in ash or if the resulting syrup is required to be of high concentration.

The molasses treated as above by the addition of hydrochloric acid, or an equivalent of other inverting materials, is then subjected to dialysis in a manner customary in chemical operations. It is advisable to use a parchment paper membrane of large area separating a body of the above solution from a body of pure water. In this manner the inorganic salts pass from the molasses into the water in the customary manner, and as a result of the osmotic pressures. At the same time there is a material increase in the volume of molasses due to its dilution with pure water which has passed into the mixture. This step is carried out in any one of the usual forms of such apparatus and may take place during the continuous forward flow of the material. When the mixture passes beyond the dialyzing apparatus it will be found to contain approximately 80% water. The solution of molasses and water may be thereupon drawn off for storage or delivery to the boilers. In the next step, the solution is boiled in open kettles or receptacles at atmospheric pressure. During this operation the solution loses the volatile impurities which unpleasantly affect the odor and flavor of the product. The boiling is continued until slight or no odors are detected. Periodically the solution is diluted with water, maintaining the proportion of the approximate 80% water by adding fresh quantities as it is lost by evaporation. This is deemed an important factor in cleaning the solution of volatile matter and free acid.

During the boiling operation, and due to the temperature at which it is carried out, there is found a marked coagulation of the organic albuminoids. These impurities separate out of the solution in such a form as to be readily removed by subsequent treatment such as filtration or settling.

The solution after having been continuously boiled until slight or no odors are detected, is drawn off and clarified. While any mode of clarification is of course possible at this stage I prefer to filter the solution. In this manner I obtain a clear dilute syrup practically free from organic matter which latter has been removed with the albuminoids.

This syrup is now in a purified form and is boiled in a vacuum pan at lower pressure and temperature, until the requisite concentration is attained. As above mentioned it is desirable that this operation be carried out until the water content is reduced to less than 25%.

In this manner a syrup may be obtained from this process which is palatable, edible and free from deleterious impurities. Moreover it will comply with such legal standards as exist in respect to mineral and water content.

In practice it is found that the product so obtained may be described as follows:

It will have a dark brownish color in deep layers and a light brownish color in thin layers. It will manifest merely a slight, mild odor and the taste is characteristically sweetish, as is typical with refined molasses. The syrup is clear, without sediment and has an acid reaction due probably to a slight percentage of sulphides which are found to be present. One example of such a syrup analyzed:

| | Per Cent. |
|---|---|
| Water | 24.06 |
| Ash or mineral matter | 4.42 |
| Sugar-sucrose-reducing sugars, etc., including organic matter | 71.52 |
| Total | 100.00 |

While my invention has been specifically described with reference to the manner in which I apply it to the refining of refuse molasses from the beet sugar industry, it is obvious that the invention is not limited to this material alone but is applicable to other like substances and that in the practical operation of the processes the individual steps may vary as to time, temperatures and proportions dependent upon the material treated. It is to be understood than many changes may be made by those skilled in the art, within the scope of the invention as defined in the appended claims.

What I claim is:

1. The process of purifying a sucrose containing mixture contaminated with inorganic salts in excess of five per cent of the total weight, which consists in adding to the mixture a sufficient quantity of hydrochloric acid to change the non-soluble inorganic salts to a soluble state, diluting the mixture with water, and in separating the soluble salts from the sugar content.

2. The process of purifying a sucrose containing molasses mixture contaminated with inorganic salts in excess of five per cent of the total weight, which consists in adding to the molasses a sufficient quantity of hydrochloric acid to change the non-soluble inorganic salts to a soluble state, heating the mixture while intimately mixing the acid and molasses, diluting the mixture with water, and in separating the soluble salts from the sugar content.

3. The process of purifying a saline sucrose-containing mixture contaminated with organic impurities, which consists in slightly over neutralizing the reaction of the mixture with a slight excess of hydrochloric acid, stirring the acid and mixture while heated, separating out the acid-converted saline impurities, boiling the thus-purified mixture to coagulate the acid-affected organic impurities, and finally separating out such coagulated organic impurities.

4. The process of obtaining food sirup from beet molasses, which consists in heating molasses, slightly over neutralizing the alkaline reaction with a sufficient excess of hydrochloric acid to invert a portion of the sugar present, separating out the soluble and the insoluble impurities which have been reacted on by the acid, and in boiling and clarifying the sirup.

5. The process of removing insoluble saline impurities from beet molasses, which consists in reacting on the molasses with hydrochloric acid to change the said impurities into soluble compounds, diluting the mixture with water, and in removing the soluble impurities by osmosis.

6. The process of breaking up the sucrose-holding impurities of a saline beet-sugar liquor and obtaining the sucrose as a food sirup, which consists in reacting on the impurities with hydrochloric acid so as simultaneously to render soluble the insoluble sucrose-holding impurities, and to precipitate out certain other of the impurities present; separating out the soluble impurities by osmosis; diluting the mixture; boiling out the volatile impurities; and in filtering out the suspended impurities.

7. The process of obtaining a portion of the sugar content of molasses as a food sirup which consists in intimately mixing with such molasses while heated a sufficient quantity of hydrochloric acid to give the mixture an acid reaction, dialyzing the mixture, boiling the diluted purified discharge from the dialyzing means while adding water from time to time to keep the water content at approximately eighty per cent, and in separating out the solid impurities after removing the volatile impurities given off in the boiling operation.

In testimony whereof, I have hereunto affixed my signature.

HEBER C. CUTLER.